(12) United States Patent
Lynam

(10) Patent No.: US 7,842,154 B2
(45) Date of Patent: Nov. 30, 2010

(54) MIRROR REFLECTIVE ELEMENT AND METHOD OF FORMING SAME

(75) Inventor: Niall R. Lynam, Holland, MI (US)

(73) Assignee: Donnelly Corporation, Holland, MI (US)

( * ) Notice: Subject to any disclaimer, the term of this patent is extended or adjusted under 35 U.S.C. 154(b) by 246 days.

(21) Appl. No.: 12/197,666

(22) Filed: Aug. 25, 2008

(65) Prior Publication Data

US 2008/0308219 A1   Dec. 18, 2008

Related U.S. Application Data

(62) Division of application No. 10/709,434, filed on May 5, 2004, now Pat. No. 7,420,756.

(60) Provisional application No. 60/471,872, filed on May 20, 2003.

(51) Int. Cl.
*B29C 47/02* (2006.01)

(52) U.S. Cl. .......................... 156/242; 156/99; 156/102; 156/244.11; 264/1.6; 264/1.7; 264/1.9; 264/173.11

(58) Field of Classification Search .................... 156/99, 156/102, 242, 244.11, 244.27; 264/1.6, 1.7, 264/1.9, 173.11
See application file for complete search history.

(56) References Cited

U.S. PATENT DOCUMENTS

| | | | |
|---|---|---|---|
| 3,451,876 A | * | 6/1969 | Edelmann et al. .......... 428/163 |
| 3,759,647 A | | 9/1973 | Schrenk et al. |
| 3,773,882 A | | 11/1973 | Schrenk |
| 3,884,606 A | | 5/1975 | Schrenk |
| 4,193,668 A | | 3/1980 | Skinner |
| 4,385,804 A | | 5/1983 | Tamura et al. |
| 4,666,264 A | | 5/1987 | Yamabe |
| 4,737,188 A | | 4/1988 | Bahls |
| 4,944,581 A | | 7/1990 | Ichikawa |
| 5,085,907 A | | 2/1992 | Smith |
| 5,262,894 A | | 11/1993 | Wheatley et al. |
| 5,361,172 A | | 11/1994 | Schissel et al. |
| 5,483,386 A | | 1/1996 | Carson |
| 5,690,768 A | * | 11/1997 | Iwasa et al. .................. 156/108 |
| 5,910,854 A | * | 6/1999 | Varaprasad et al. ......... 359/273 |
| 6,030,084 A | | 2/2000 | Schmidt |
| 6,409,354 B1 | | 6/2002 | Richard |
| 6,522,451 B1 | | 2/2003 | Lynam |
| 6,709,119 B2 | | 3/2004 | Gillich et al. |
| 7,420,756 B2 | | 9/2008 | Lynam |

* cited by examiner

*Primary Examiner*—Joseph S Del Sole
*Assistant Examiner*—Timothy Kennedy
(74) *Attorney, Agent, or Firm*—Van Dyke, Gardner, Linn & Burkhart, LLP

(57) ABSTRACT

A method for forming a reflective element substrate for a mirror assembly of a vehicle includes generally continuously forming an elongated sheet of substrate material and applying a substantially transparent functional film to a surface of the elongated sheet. The substantially transparent functional film is unrolled from a reel or roll of the film and the unrolled film is applied to the surface of the elongated sheet generally continuously as the sheet is formed or extruded or cast. Two or more mirror substrates are formed from the elongated sheet after the film is applied to the surface of the sheet.

20 Claims, 3 Drawing Sheets

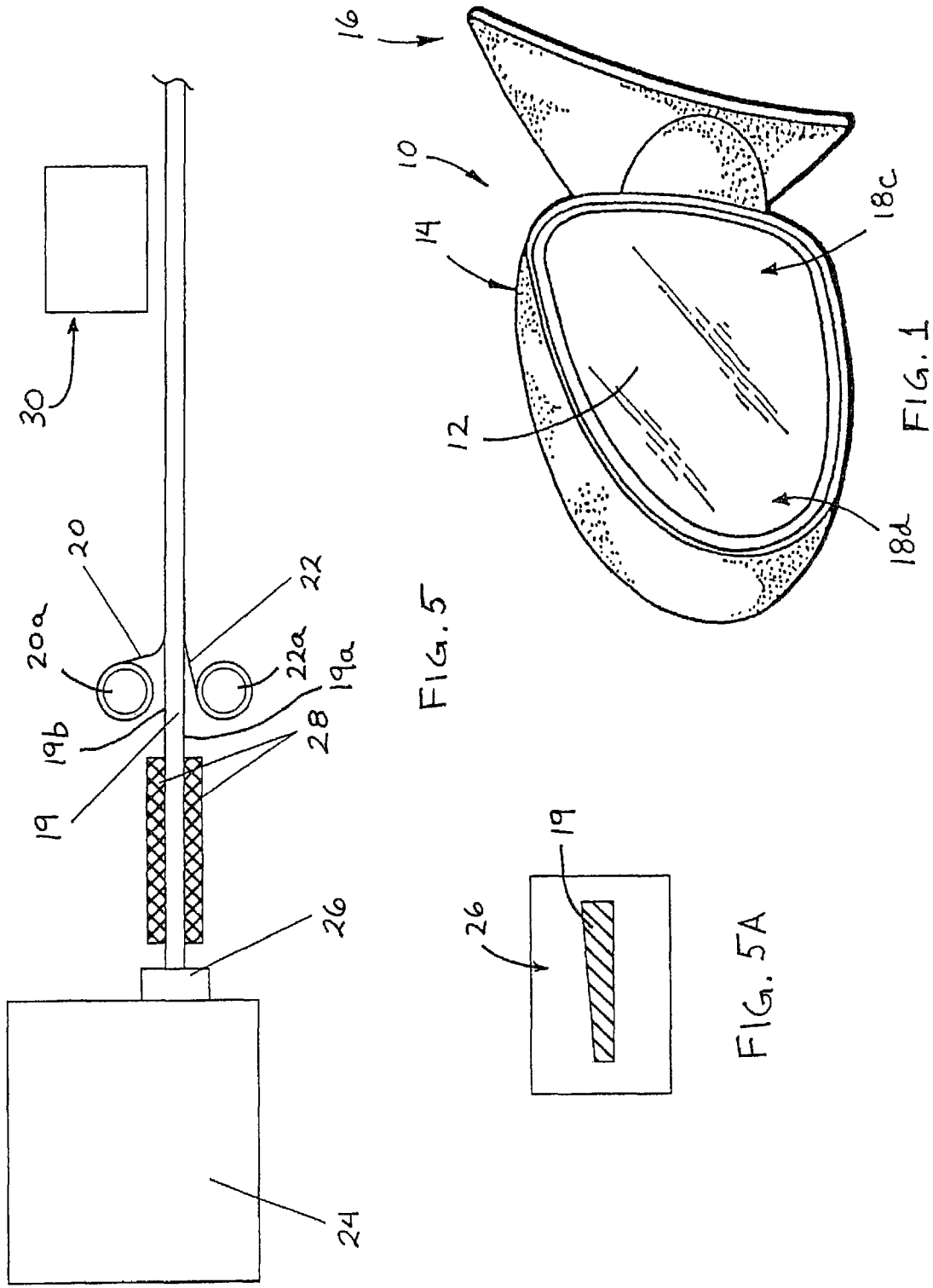

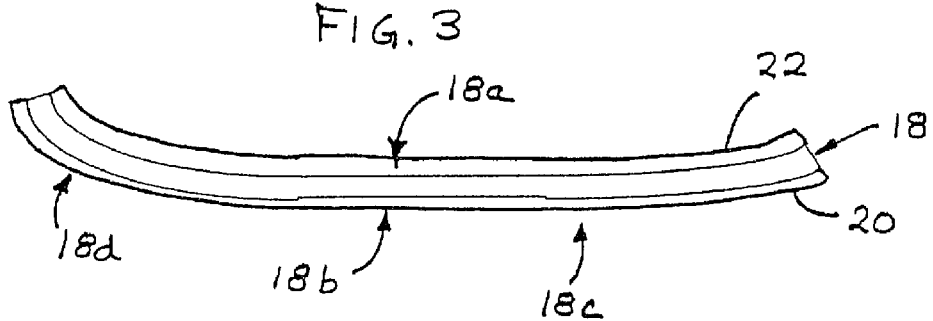
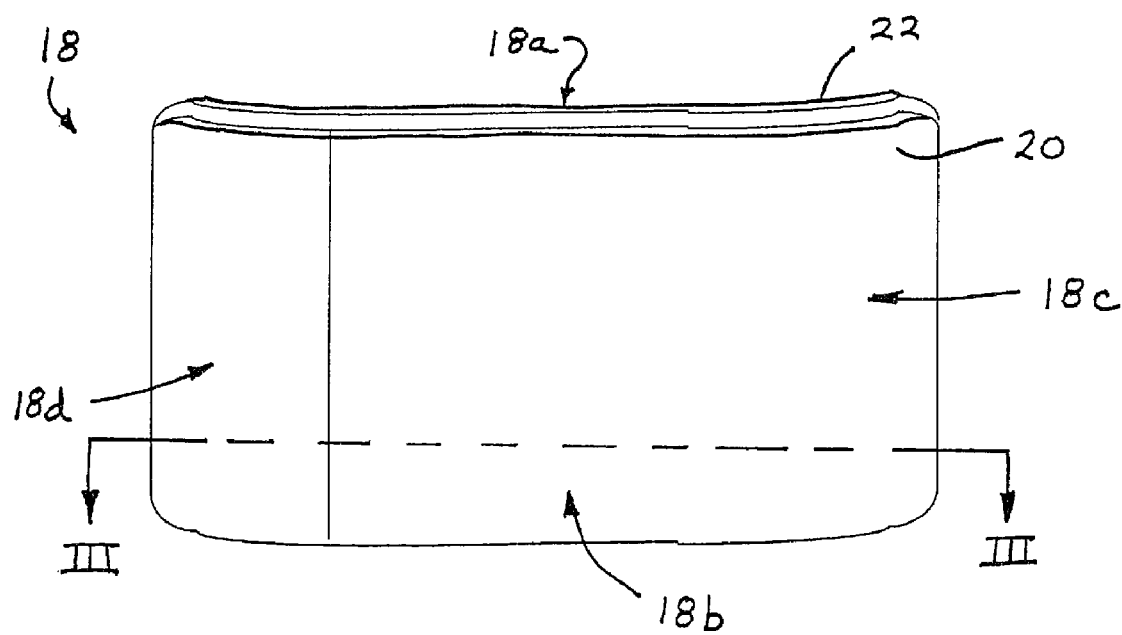
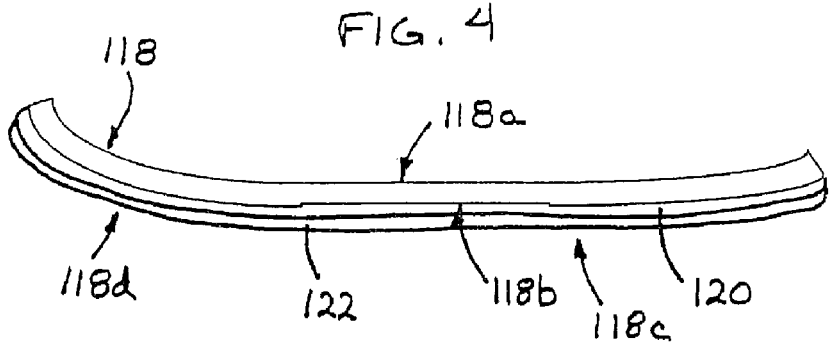

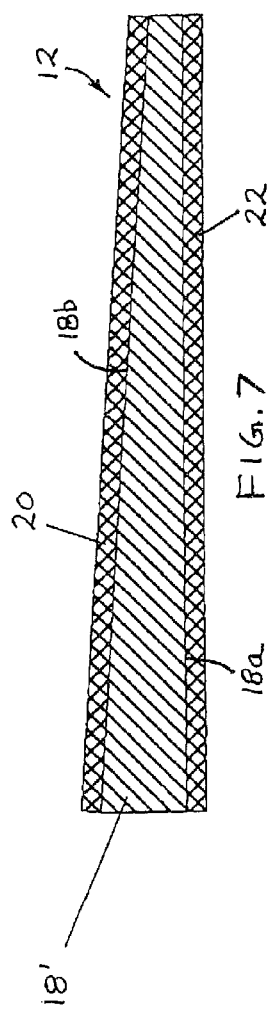
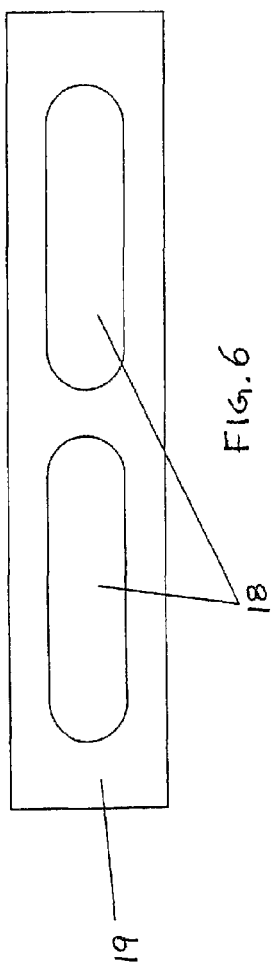
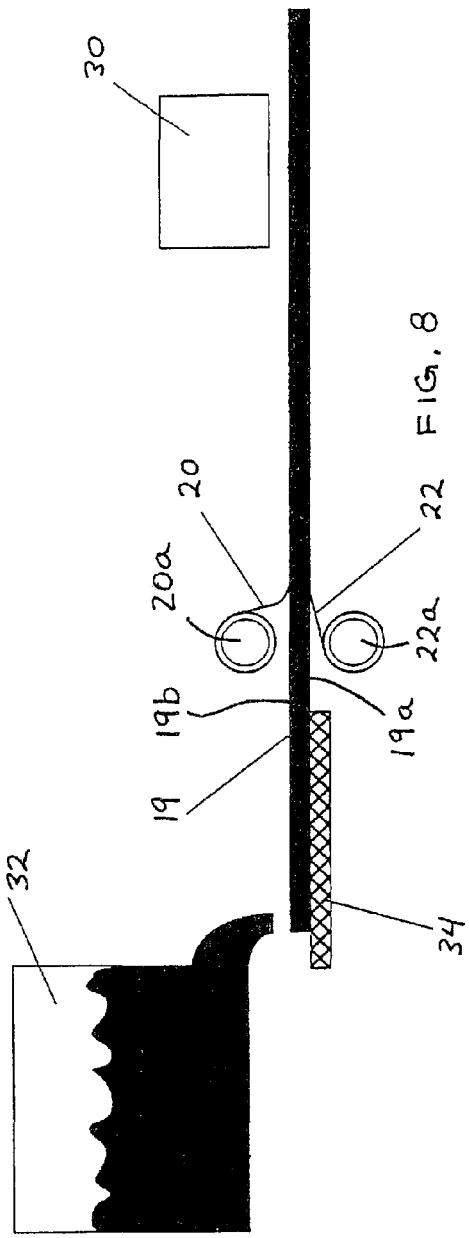

MIRROR REFLECTIVE ELEMENT AND METHOD OF FORMING SAME

CROSS REFERENCE TO RELATED APPLICATIONS

The present application is a division of U.S. patent application Ser. No. 10/709,434, filed May 5, 2004, now U.S. Pat. No. 7,420,756, which claims the benefit of U.S. provisional application Ser. No. 60/471,872, filed May 20, 2003, which is hereby incorporated herein by reference in its entirety.

FIELD OF THE INVENTION

The present invention relates generally to rearview mirror elements for a rearview mirror assembly of a vehicle and, more particularly, to exterior rearview mirror elements comprising multi-radius reflective elements.

BACKGROUND OF THE INVENTION

Typically, mirror reflective elements are formed of glass and have a reflective coating deposited thereon, such as via vacuum deposition or wet chemical silvering or the like, such as on a silver line, such as described in U.S. Pat. No. 4,737,188, which is hereby incorporated herein by reference. Polymeric reflective elements are also known, such as are described in U.S. Pat. Nos. 6,601,960; 6,409,354; 4,944,581; 4,385,804; 4,193,668; 4,666,264; and 5,483,386, which are hereby incorporated herein by reference. For such polymeric mirror reflective elements, the need exists for a hard coat or surface on the first or outer or exterior surface of the element which is contacted by the exterior elements, such as rain, road debris, or the like, or contacted, for example, by a person scraping ice or wiping snow or condensation off the mirror element outer surface, such as during winter. A variety of hard coats have been proposed in the art, typically applied by dip coating or vacuum deposition techniques. However, a need exists for an automotive mirror reflective element which has the properties of plastic (i.e., a specific gravity roughly half that of glass), and which has a glass-like exterior surface.

Also, exterior rearview mirror reflective elements may be aspheric or multi-radius, and may typically have a less curved or substantially flat (around 2000 mm radius or thereabouts) inboard portion or surface at the inboard side of the reflective element (i.e., closer to the side body of the vehicle when the mirror assembly is mounted to the vehicle), and a more curved multi-radius portion or surface at the outboard side of the reflective element (i.e., further from the side body of the vehicle when the mirror assembly is mounted to the vehicle), in order to provide an extended field of view. It is typically desirable to have the reflective elements or substrates of such exterior mirror elements to be formed of a glass material because glass material typically provides an enhanced scratch resistance over conventional optical resins and the like.

Therefore, there is a need in the art for a mirror reflective element that overcomes the shortcomings of the prior art elements and substrates.

SUMMARY OF THE INVENTION

The present invention provides a molded wide angle or multi-radius substrate for a reflective element. The molded substrate comprises a polymeric optical resin transparent material and has a curved exterior surface, which may have a less curved/flatter or substantially flat inboard portion or surface and a more curved outboard portion or surface. The molded substrate may have an anti-abrasion film or layer, such as an ultrathin glass film, applied over the exterior surface or first surface to provide substantial protection against scratches occurring to the molded substrate. The inner surface or second surface of the reflective element substrate may have a reflective coating or layer, such as a polymeric reflective film, laminated or adhered or otherwise applied thereto.

According to an aspect of the present invention, a wide angle reflective element for a mirror assembly for a vehicle includes a wide angle substrate having an exterior surface and a glass film disposed at the exterior surface. The exterior surface of the substrate has a less curved inboard portion or surface and a more curved outboard portion or surface. The substrate comprises a polymeric resin material. The glass film is adapted to substantially conform to the exterior surface of the wide angle substrate. The glass film comprises a glass material and has a thickness of less than approximately 0.8 mm.

According to another aspect of the present invention, a reflective element for a mirror assembly for a vehicle comprises a substrate having an exterior surface, and an anti-abrasion film applied to the exterior surface. The substrate comprises a polymeric resin material, such as a transparent optical polymeric resin material. The anti-abrasion film preferably comprises a glass material (such as a soda lime glass or a borosilicate or the like) and has a thickness of less than approximately 0.8 mm, and is flexible to conform to the exterior surface.

The substrate may be cut from a strip or sheet of molded or extruded or cast substrate material (or less preferably, may be cut from an injected molded strip or sheet). The flexible glass film may be unrolled from a reel or roll and applied to the exterior surface of the elongated strip or sheet of substrate material. The substrate, including the glass film or layer, may then be cut or otherwise formed from the elongated strip or sheet.

The substrate may comprise a wide angle substrate and/or may comprise a multi-radius exterior surface having a less curved inboard portion or surface and a more curved outboard portion or surface.

A reflective film or layer may be applied to the inner surface or side of the substrate or strip opposite the exterior surface. The reflective film may comprise a polymeric reflective film laminated or otherwise adhered or applied to the inner side of the substrate or strip. The reflective film may comprise an all polymer-thin-film multilayer, high reflective mirror film comprising multiple coextrusion of many plastic layers to form a highly reflective mirror film.

Optionally, a reflective film or layer may be applied to the exterior surface of the substrate or sheet or strip, and the glass film or layer or sheet may be applied over the reflective film layer. In such an application, the substrate acts as a support or backing plate for the reflective film or layer and the glass film or layer, whereby optical clarity/transparency of the substrate material is not necessary.

According to another aspect of the present invention, a method for forming a reflective element substrate for a mirror assembly of a vehicle comprises generally continuously forming an elongated strip or sheet of substrate material and applying a substantially transparent functional film, such as an anti-abrasion film or a hydrophilic film or a hydrophobic film or the like, to a surface of the elongated strip sheet. The substrate material may comprise a transparent optical polymeric resin. The functional film is preferably unrolled from a reel or roll of film and applied to the surface of the elongated strip or sheet generally continuously as the strip or sheet is formed or extruded or cast or molded. Preferably, multiple mirror element shapes or mirror element substrates may be cut or otherwise formed from the elongated sheet after the functional film is applied to the surface of the strip or sheet.

The functional or anti-abrasion film may comprise an ultrathin glass material which is sufficiently flexible to be provided in a reel or roll (or in a sheet that is flexible and conformable to a bent substrate). The substrates may be formed with a wide angle exterior surface or a multi-radius exterior surface. The anti-abrasion film may be sufficiently flexible to conform to the wide angle or multi-radius or curved exterior surface.

A reflective film, such as a polymeric reflective film or the like, may be applied to the opposite surface of the substrate or sheet or strip. The reflective film may be sufficiently flexible to be provided in a reel or roll form (or in a sheet that is flexible and conformable to a bent substrate) for unrolling the reflective film as the film is generally continuously applied to the surface of the generally continuously formed sheet or strip.

Therefore, the present invention provides a molded wide angle or multi-radius single substrate for a rearview mirror assembly which has an anti-abrasion or anti-scratch film or layer applied to the curved, wide angle or multi-radius exterior surface of the substrate. The anti-abrasion film preferably comprises an ultrathin glass film or sheet to provide enhanced scratch resistance. The molded substrate may have a reflective film or layer laminated or applied to the inner surface opposite the exterior surface.

These and other objects, advantages, purposes and features of the present invention will become apparent upon review of the following specification in conjunction with the drawings.

BRIEF DESCRIPTION OF THE DRAWINGS

FIG. 1 is a perspective view of an exterior rearview mirror assembly in accordance with the present invention;

FIG. 2 is a perspective view of a wide angle or multi-radius reflective element in accordance with the present invention;

FIG. 3 is a sectional view of the wide angle or multi-radius reflective element taken along the line III-III in FIG. 2;

FIG. 4 is a sectional view similar to FIG. 3, showing a wide angle or multi-radius reflective element in accordance with the present invention with a reflective film or layer applied to the exterior surface of the element and an anti-abrasion film or layer applied over the reflective film or layer;

FIG. 5 is a diagram showing the extruding, coating and cutting processes for manufacturing a prismatic mirror reflective element in accordance with the present invention;

FIG. 5A is an elevation of the extruder of FIG. 5, showing the wedge shape of the extruded strip and reflective element substrate;

FIG. 6 is a plan view of the extruded strip showing the cut out shapes of the reflective element cut from the extruded strip;

FIG. 7 is a sectional view of the reflective element formed by the process shown in FIG. 5; and FIG. 8 is a diagram showing an alternate process for manufacturing a prismatic mirror reflective element in accordance with the present invention, where a strip of substrate material is cast and formed via a caster and float section.

DESCRIPTION OF THE PREFERRED EMBODIMENTS

Referring now to the drawings and the illustrative embodiments depicted therein, an exterior rearview mirror assembly 10 includes a reflective element 12 mounted at a casing 14, which is mounted at an exterior portion of a vehicle 16 (FIG. 1). Reflective element 12 may provide an enhanced field of view or wide angle field of view to a driver or occupant of the vehicle and may comprise a single reflective element substrate 18 having an inner surface 18a and an opposite exterior surface 18b (FIGS. 2 and 3). The exterior surface 18b comprises a less curved or substantially flat inboard portion or surface 18c and a more curved outboard portion or surface 18d, as discussed below. The substrate 18 may have an anti-abrasion coating or layer or film 20, such as an ultrathin glass coating or layer or film, laminated or deposited or otherwise applied to the exterior surface 18b, and may have a reflective coating or layer 22 laminated or applied to the inner surface 18a, as also discussed below. Aspects of the reflective element of the present invention may be suitable for use in a reflective element for an exterior rearview mirror assembly (as shown in FIG. 1) and/or a reflective element for an interior rearview mirror assembly (not shown).

Reflective element 12 may comprise an aspheric or multi-radius or wide angle single element reflective element substrate. The reflective element 12 may provide a field of view similar to the plano-auxiliary reflective element assembly disclosed in U.S. Pat. Nos. 6,522,451 and 6,717,712, which are hereby incorporated herein by reference.

The substrate 18 of the reflective element 12 of the present invention may be formed (such as by casting, extrusion or injection molding) of a polymeric optical resin material, such as an acrylic or polycarbonate resin, a polyolefin, a cyclic olefin copolymer, such as a COC resin known as "TOPAS" and available from Ticona of Summit, N.J. (such as a resin of the type described in U.S. patent application Ser. No. 09/946,228, filed Sep. 5, 2001 for IMPROVED PLASTIC SUBSTRATE FOR INFORMATION DEVICE AND METHOD FOR MAKING SAME, which is hereby incorporated herein by reference) or the like. Because the substrate can be, for example, injection molded from an optical resin, the substrate may be molded or formed to a desired shape having a wide angle or multi-radius surface, which is typically challenging to accomplish with glass sheets. This is because any prescription or form for the substrate can be established in an injection mold by machining, such that when the injection mold is filled with molten injected optical resin material, the optical resin material takes the shape of the mold. Thus, for example, a substrate having a substantially or fully flat inboard region for a multi-radius (often referred to as an aspheric) exterior mirror element is fully practical.

As shown in FIGS. 1-3, inboard portion or surface 18c of exterior surface 18b is positioned at or toward the side of the reflective element that is toward the side body of the vehicle when the mirror assembly is mounted to or attached to the vehicle. The inboard portion 18c of surface 18b of substrate 18 may comprise a substantially flat or slightly curved or less curved surface, such as a surface having a radius of curvature of preferably greater than at least approximately 4000 mm, more preferably greater than at least approximately 9000 mm, and most preferably greater than at least approximately 12000 mm. The inboard surface 18c may provide a field of view of up to approximately 10 degrees, preferably up to approximately 15 degrees, and more preferably up to approximately 20 degrees.

Outboard portion or surface 18d of exterior surface 18b of substrate 18 is positioned outward from inboard portion and is thus further away from the side body of the vehicle when the mirror assembly is mounted to or attached to the vehicle. Outboard portion 18d of exterior surface 18b may be a more convex or curved surface, such that the substrate comprises a wide angle or multi-radius exterior surface substrate. The more curved outboard surface 18d of the substrate may have radii of curvature in the range of less than about 4000 mm to about 100 mm or lower. The more curved outboard portion or surface 18*d* may provide an extended field of view when combined with the less curved inboard portion or surface 18*c*. For example, the combined field of view of the mirror reflective element 12 may be preferably greater than at least approximately 25 degrees, more preferably greater than at least approximately 35 degrees, and most preferably greater than at least approximately 45 degrees. The substrate may be formed to have curves or shapes or to provide other field of views, without affecting the scope of the present invention.

The exterior surface 18*b* of substrate 18 may be coated or covered with a substantially transparent functional film or layer 20, such as an anti-abrasion film or layer, such as an ultrathin glass film or layer or sheet having a thickness of preferably less than or equal to approximately 0.8 mm, more preferably less than or equal to approximately 0.5 mm, and most preferably less than or equal to approximately 0.3 mm. The ultrathin glass film or layer or sheet 20 provides a flexible glass film which can be conformed to the exterior surface of the molded substrate (for example, such as described in U.S. Pat. No. 5,085,907, which is hereby incorporated herein by reference) after the substrate is molded. The ultrathin glass film or layer may provide substantial protection against scratches on the outboard surface, such as may occur due to impact by debris at the outside of the vehicle (for exterior mirror assembly applications) or by use of ice scrapers and the like on the glass surface and the like. The ultrathin glass film or layer may be applied to a molded or extruded strip (such as described below with respect to FIGS. 5-8) or may be applied to the surface or surfaces of a formed or cut substrate, without affecting the scope of the present invention. The flexible ultrathin glass film or layer of the present invention allows the wide angle or multi-radius substrate to be molded in the desired shape out of a transparent acrylic resin material, yet may conform to the curved or multi-radius or aspheric shape and provide enhanced protection or scratch resistance to the substrate.

It is envisioned that other functional films or hard coats or anti-abrasion films or the like may be applied to the exterior surface of the molded substrate, such as via adhering or applying a film to the exterior surface or via dip coating or vacuum deposition or the like. Optionally, a hydrophobic film or hydrophilic film or element or property may also or otherwise be applied to the exterior surface 18*b* of the substrate. Optionally, the functional film may comprise a non-glass or polymeric film, such as a polymeric material that is a harder and/or different property material than the substrate itself. Optionally, the anti-abrasion film may be formed of the same resin material as the substrate to match the coefficients of thermal expansion and thus reduce thermal expansion/contraction mismatches between the materials.

Optionally, the inner or rear surface 18*a* of the substrate 18 may have a reflective layer or coating or film or sheet 22 laminated or otherwise applied thereto. For example, the reflective layer or film 22 may comprise a polymeric reflective film 22 laminated or otherwise adhered or applied to the rear or inner surface 18*a* of a molded or extruded or cast strip (such as described below with respect to FIGS. 5-8) or of the molded or formed substrate 18. Reflective film 22 may comprise a polymeric reflective film, such as an all polymer-thin-film multilayer, high reflective mirror film, such as a multilayer, non-metallic reflective film which may comprise multiple coextrusion of many plastic layers to form a highly reflective mirror film, such as described in U.S. Pat. Nos. 3,773,882; 3,884,606; and 3,759,647, which are hereby incorporated herein by reference. Such a reflective film thus may comprise multilayers of polymer materials to form a highly reflective mirror film, such as a Radiant Light Film, a Radiant Mirror Film or a Radiant Color Film, such as commercially available from 3M of St. Paul, Minn., such as a Radiant Color Film CM590 or CM500. Also, a durable metallized polymeric mirror layer can be used, such as described in U.S. Pat. No. 5,361,172, which is hereby incorporated herein by reference.

As shown in FIG. 4, it is envisioned that a substrate or substrate shape or sheet or strip of substrate material 118 may have a reflective film or layer 122 adhered or laminated or otherwise applied to the exterior surface 118*b* of the substrate material. An anti-abrasion film or layer 120 (which may comprise an ultrathin glass film or layer as described above) may be adhered or laminated or otherwise applied to the reflective film or layer 122. In such an application, with the reflective layer on the front or exterior surface of the substrate, the substrate material may be molded or formed of a polymeric material that does not provide optical clarity and need not be transparent. The substrate material may act only as a support or backing plate for the reflective film or layer and the anti-abrasion film or layer and thus may be opaque or non-transparent. The exterior surface 118*b* of substrate material 118 may comprise a wide angle exterior surface or a multi-radius exterior surface having a less curved inboard portion or surface 118*c* and a more curved outboard portion or surface 118*d*, such as discussed above with respect to substrate 18.

Optionally, and such as shown in FIGS. 5, 6 and 8, the optical resin material may be molded or extruded or cast into a generally continuous strip 19 having the desired curved or multi-radius surfaces, and may be cut to form the substrates. The substrates may be cut from the strip via any known cutting process, such as via a laser cutting process or a water-jet cutting process or the like, without affecting the scope of the present invention.

As shown in FIGS. 5-8, the molding processes and film or layer application processes of the present invention may be used to form a prismatic or wedge-shaped strip for forming prismatic or wedge-shaped substrates 18' (FIG. 7) for use in an interior rearview mirror assembly of a vehicle.

As also shown in FIGS. 5-8, the substrate material or optical resin material may be extruded or cast to form the continuous strip or sheet 19. For example, and as shown in FIGS. 5 and 5A, the strip 19 may be extruded by an extruder 24, which, preferably continuously, extrudes the optical resin material through an extrusion nozzle 26. The extruded material may be moved through an annealing lehr 28 to reduce or substantially eliminate birefringence, striation, stress and/or distortion in the strip or substrates. The coatings or layers or films 20 and/or 22 may be applied to one or both surfaces of the strip or substrate after the annealing process. The strip 19 may then be cut, such as via laser cutting or water-jet cutting devices or processes 30, or via other forming processes, to form the substrates 18' after the films or coatings have been applied thereto.

Optionally, and as shown in FIG. 8, the strip 19 of optical polymeric resin material may be cast by a caster 32, which deposits the molten polymer or resin material onto a float section 34, such as a heated plate or heated melt. The float section 34 may be angled to form the wedge-shaped strip as the strip or ribbon of cast molten polymer solidifies as it passes across the hot float section (it is also envisioned that the float may provide a curved surface to form the curved outboard surface of the substrate). The coatings or layers or films 20, 22 may be applied to the solidified strip and the strip may be cut to form the substrates after the coatings or layers or films have been applied thereto.

Because the films or layers are flexible, it is envisioned that the anti-abrasion film or ultrathin glass film and/or the reflective polymeric film may be unwound or unrolled and applied along the generally continuously extruded or cast substrate material or strip 19. For example, and as shown in FIGS. 5-8, the ultrathin glass film (or other outer layer anti-abrasion coating or film) 20 may be provided in a reel or roll form or strip 20a and may be unwound or unrolled and laminated or otherwise adhered or applied along the exterior surface 19b of the extruded or cast strip 19 of substrate material. Likewise, the reflective polymeric film 22 may be provided in a reel or roll form or strip 22a and may be attached or applied to the inner surface 19a of the substrate material strip 19, such as via laminating or adhering or otherwise applying the film to the substrate material, such as by using optical adhesive and/or via rolling or ironing the film or sheet (preferably at an elevated temperature and with vacuum assist) onto the substrate or strip surface, to secure the reflective film to the substrate or extruded or cast strip or sheet.

Optionally, the glass film or layer or sheet (or reel or roll of glass sheet or strip) may be coated with a highly reflective metallic layer, such as silver or aluminum or the like, deposited on or applied to its inner surface (i.e., the surface which is adhered to or otherwise applied to the substrate or substrate sheet or strip). The reflective layer or coating may be applied to the glass film or layer with or without transparent overcoats. The glass film thus may provide the reflective layer at the exterior surface of the substrate, such that the reflective layer provides the second layer or surface, with the substrate behind the reflective layer. The glass sheet or film may thus be provided with the reflective mirror coating already applied thereto. The glass layer with reflective layer or coating applied thereto may be provided in a reel or roll form for applying both the reflective layer and the anti-abrasion layer to the exterior surface of the substrate or substrate strip or sheet in one application process. In such an application, the substrate material need not comprise a transparent optical resin material, and a separate reflective layer or film or coating would not be necessary at the inner or rear surface of the substrate.

It is envisioned that other hard coats or films or the like may be applied to one or more surfaces of the molded substrate strip or to the molded and cut substrates, such as via dip coating or vacuum deposition or the like, without affecting the scope of the present invention. The other hard coats or films may be substantially flexible and may be applied via unrolling of a reel of an anti-abrasion film or sheet and applying the film or sheet to a surface of an extruded or cast strip of transparent acrylic resin or the like, as discussed above. Optionally, a hydrophobic film or hydrophilic film or element or property may also or otherwise be applied to (or sprayed on) one or both surfaces 18a, 18b of the substrate or strip or sheet. Optionally, one or both of the reflective polymeric film 22 and the anti-abrasion film 20 may be formed of the same resin material as the substrate 18, 18' or substrate strip 19 to match the coefficients of thermal expansion and thus reduce thermal expansion/contraction mismatches between the materials.

Optionally, it is envisioned that such ultrathin glass films, anti-abrasion films, reflective films or reflective systems may be used for electrochromic mirror reflective elements or cells as well. For example, the interior or exterior rearview mirror assembly of the present invention may comprise an electrochromic mirror, such as an electrochromic mirror assembly and electrochromic element utilizing principles disclosed in commonly assigned U.S. Pat. Nos. 5,140,455; 5,151,816; 6,690,268; 6,178,034; 6,154,306; 6,002,544; 5,567,360; 5,525,264; 5,610,756; 5,406,414; 5,253,109; 5,076,673; 5,073,012; 5,117,346; 5,724,187; 5,668,663; 5,910,854; 5,142,407 and/or 4,712,879, which are hereby incorporated herein by reference, and/or as disclosed in the following publications: N. R. Lynam, "Electrochromic Automotive Day/Night Mirrors", SAE Technical Paper Series 870636 (1987); N. R. Lynam, "Smart Windows for Automobiles", SAE Technical Paper Series 900419 (1990); N. R. Lynam and A. Agrawal, "Automotive Applications of Chromogenic Materials", Large Area Chromogenics: Materials and Devices for Transmittance Control, C. M. Lampert and C. G. Granquist, EDS., Optical Engineering Press, Wash. (1990), which are hereby incorporated by reference herein. The mirror assembly may comprise an interior rearview mirror assembly, and may include an accessory module or may be mounted to an accessory module, such as an accessory module of the types disclosed in U.S. patent application Ser. No. 10/355,454, filed Jan. 31, 2003 for VEHICLE ACCESSORY MODULE, now U.S. Pat. No. 6,824,281, which is hereby incorporated herein by reference.

Optionally, the mirror assembly may include one or more displays for displaying information to a driver of the vehicle at or through the reflective element of the mirror assembly. For example, the mirror assembly may include one or more displays of the types described in U.S. Pat. Nos. 6,329,925; 6,501,387; 6,690,268; 5,910,854; 6,420,036; 5,668,663; and 5,724,187, and/or in U.S. patent application Ser. No. 10/054,633, filed Jan. 22, 2002 by Lynam et al. for VEHICULAR LIGHTING SYSTEM, now U.S. Pat. No. 7,195,381; and Ser. No. 10/456,599, filed Jun. 6, 2003 by Weller et al. for INTERIOR REARVIEW MIRROR SYSTEM WITH COMPASS, now U.S. Pat. No. 7,004,593, and/or in PCT Application No. PCT/US03/29776, filed Sep. 19, 2003 by Donnelly Corporation et al. for ELECTROCHROMIC MIRROR ASSEMBLY; PCT Application No. PCT/US03/35381, filed Nov. 5, 2003 by Donnelly Corporation et al. for ELECTRO-OPTIC REFLECTIVE ELEMENT ASSEMBLY; and/or PCT Application No. PCT/US03/40611, filed Dec. 19, 2003 by Donnelly Corporation et al. for ACCESSORY SYSTEM FOR VEHICLE, and/or in U.S. provisional applications, Ser. No. 60/508,086, filed Oct. 2, 2003 by Schofield for MIRROR REFLECTIVE ELEMENT ASSEMBLY INCLUDING ELECTRONIC COMPONENT; Ser. No. 60/525,952, filed Nov. 26, 2003 by Lynam for MIRROR REFLECTIVE ELEMENT FOR A VEHICLE; Ser. No. 60/471,546, filed May 19, 2003; Ser. No. 60/525,537, filed Nov. 26, 2003; and Ser. No. 60/556,259, filed Mar. 25, 2004, which are all hereby incorporated herein by reference, without affecting the scope of the present invention.

Optionally, the mirror assembly may include or be associated with electronic accessories, such as, for example, antennas, including global positioning system (GPS) or cellular phone antennas, such as disclosed in U.S. Pat. No. 5,971,552, a communication module, such as disclosed in U.S. Pat. No. 5,798,688, a blind spot detection system, such as disclosed in U.S. Pat. Nos. 5,929,786 and/or 5,786,772, a high/low headlamp controller, such as disclosed in U.S. Pat. Nos. 5,796,094 and/or 5,715,093, transmitters and/or receivers, such as a garage door opener or the like, a digital network, such as described in U.S. Pat. No. 5,798,575, a memory mirror system, such as disclosed in U.S. Pat. No. 5,796,176, a hands-free phone attachment, a video device for internal cabin surveillance and/or video telephone function, such as disclosed in U.S. Pat. Nos. 5,760,962 and/or 5,877,897, a remote keyless entry receiver or system or circuitry and/or a universal garage door opening system or circuitry (such as the types disclosed in U.S. Pat. Nos. 6,396,408; 6,362,771; 5,798,688 and 5,479,155, and/or U.S. patent application Ser. No. 10/770,736, filed Feb. 3, 2004 by Baumgardner et al. for GARAGE DOOR OPENING SYSTEM FOR VEHICLE, now U.S. Pat. No. 7,023,322), lights, such as map reading lights or one or more other lights or illumination sources, such as disclosed in U.S. Pat. Nos. 6,690,268; 5,938,321; 5,813,745; 5,820,245; 5,673,994; 5,649,756; 5,178,448; 5,671,996; 4,646,210; 4,733,336; 4,807,096; 6,042,253; and/or 5,669,698, and/or U.S. patent application Ser. No. 10/054,633, filed Jan. 22, 2002 by Lynam et al. for VEHICULAR LIGHTING SYSTEM, now U.S. Pat. No. 7,195,381, microphones, such as disclosed in U.S. Pat. Nos. 6,243,003; 6,278,377; and/or 6,420,975, and/or PCT Application No. PCT/US03/30877, filed Oct. 1, 2003, speakers, a compass or compass system, such as disclosed in U.S. Pat. Nos. 5,924,212; 4,862,594; 4,937,945; 5,131,154; 5,255,442; and/or 5,632,092, and/or U.S. patent application Ser. No. 10/456,599, filed Jun. 6, 2003 by Weller et al. for INTERIOR REARVIEW MIRROR SYSTEM WITH COMPASS, now U.S. Pat. No. 7,004,593, a navigation system, such as described in U.S. Pat. No. 6,477,464, and U.S. patent application Ser. No. 10/456,599, filed Jun. 6, 2003 by Weller et al. for INTERIOR REARVIEW MIRROR SYSTEM WITH COMPASS, now U.S. Pat. No. 7,004,593; Ser. No. 10/287,178, filed Nov. 4, 2002 by McCarthy et al. for NAVIGATION SYSTEM FOR A VEHICLE, now U.S. Pat. No. 6,678,614; Ser. No. 10/645,762, filed Aug. 20, 2003 by Taylor et al. for VEHICLE NAVIGATION SYSTEM FOR USE WITH A TELEMATICS SYSTEM, now U.S. Pat. No. 7,167,796; and Ser. No. 10/422,378, filed Apr. 24, 2003, now U.S. Pat. No. 6,946,978; and/or PCT Application No. PCT/US03/40611, filed Dec. 19, 2003 by Donnelly Corporation et al. for ACCESSORY SYSTEM FOR VEHICLE, a tire pressure monitoring system, such as the types disclosed in U.S. Pat. Nos. 6,294,989; 6,445,287; and/or 6,472,979, and/or in U.S. patent application Ser. No. 10/206,495, filed Jul. 26, 2002 by Schofield et al. for SELF TRAINING TIRE PRESSURE MONITORING SYSTEM, now U.S. Pat. No. 6,731,205, a seat occupancy detector, a trip computer, a telematics system, such as an ONSTAR® system or the like, and/or any other desired accessory or system or the like (with all of the above-referenced patents and patent applications and PCT applications being commonly assigned to Donnelly Corporation, and with the disclosures of all of the above referenced patents and patent applications and PCT applications being hereby incorporated herein by reference in their entireties).

Optionally, a vehicle compass or compass system may comprise a printed circuit board and may be positioned within a pod or the like that may be fixedly mounted in the vehicle. The compass may be initially calibrated (such as at the assembly plant or the like) via a small Helmholtz coil that may accommodate the small circuit board or pod. The coil induces a field to calibrate the compass, such as described in U.S. provisional application Ser. No. 60/467,899, filed May 5, 2003, which is hereby incorporated herein by reference in its entirety. The induced field in the miniature Helmholtz coil may be controlled via the use of a highly permeable magnetic shielding material that may enclose the miniature Helmholtz coil with only a small slot for the circuit board or compass pod to enter through. Such a set up may allow the compass pod manufacturer to automate and magnetically shield the calibration and test stage of a microprocessor-based compass. The calibration process may utilize an indexing rotary table that may rotate to move a compass pod from a loading bay to a calibration bay. The shielded Helmholtz coil may be adjacent to the rotary table and may be shuttled back and forth to align with the rotary table to receive a compass pod therefrom. The rotary table may rotate to move a calibrated compass pod (after it leaves the miniature Helmholtz coil) from the calibration bay to a final functional test station to test the calibrated compass pod.

Therefore, the present invention provides a wide angle or multi-radius single substrate or reflective element which may provide an enhanced field of view for an interior or exterior rearview mirror assembly. The wide angle or multi-radius single element reflector may have an anti-abrasion coating or ultrathin glass film conformed to and applied to the exterior curved surface of the substrate. The substrate may be molded or extruded into the desired shape and may be formed into an elongated strip or sheet, whereby the anti-abrasion coating or film may be applied along the strip before the strip is cut into the desired substrates. The present invention thus provides a single element wide angle or multi-radius substrate which has enhanced scratch resistance. A polymeric reflective film may be laminated, adhered or otherwise applied to the opposite inner surface of the substrate or extruded strip while the anti-abrasion coating or film is applied to the exterior surface. Optionally, a reflective film or layer may be applied to the exterior surface of the substrate and an anti-abrasion film or layer may be applied to the reflective film or layer.

Changes and modifications in the specifically described embodiments can be carried out without departing from the principles of the present invention, which is intended to be limited only by the scope of the appended claims, as interpreted according to the principles of patent law.

The embodiments of the invention in which an exclusive property or privilege is claimed are defined as follows:

1. A method for forming a reflective element substrate for a mirror assembly of a vehicle comprising:

generally continuously forming an elongated sheet of substrate material, said substrate material comprising a polymeric resin material;

applying a substantially transparent functional film to a surface of said elongated sheet, wherein said functional film comprises an ultrathin glass material which is sufficiently flexible to be provided in a reel or roll;

unrolling said substantially transparent functional film from a reel or roll of said film and applying said unrolled film to said surface of said elongated sheet generally continuously as said sheet is formed or extruded or cast; and forming two or more mirror substrates from said elongated sheet after said film is applied to said surface of said sheet.

2. The method of claim 1, wherein said substantially transparent functional film provides an anti-abrasion function.

3. The method of claim 1, wherein said substantially transparent functional film provides a hydrophobic function.

4. A method for forming a reflective element substrate for a mirror assembly of a vehicle comprising:

generally continuously forming an elongated sheet of substrate material, said substrate material comprising a polymeric resin material;

applying a substantially transparent functional film to a surface of said elongated sheet;

unrolling said substantially transparent functional film from a reel or roll of said film and applying said unrolled film to said surface of said elongated sheet generally continuously as said sheet is formed or extruded or cast; and forming two or more mirror substrates from said elongated sheet after said film is applied to said surface of said sheet, wherein said substrates are formed with a wide angle or multi-radius exterior surface, said functional film being sufficiently flexible to conform to said wide angle or multi-radius curved surface.

5. The method of claim 4 including applying a reflective film to an opposite surface of said sheet.

6. The method of claim 5, wherein said reflective film is sufficiently flexible to be provided in a reel or roll form, said method including unrolling said reflective film and generally continuously applying said reflective film to said opposite surface of said generally continuously formed sheet.

7. The method of claim 4 including applying a reflective film to said surface of said sheet, wherein applying said functional film comprises applying said functional film to said reflective film.

8. The method of claim 7, wherein said reflective film is sufficiently flexible to be provided in a reel or roll than, said method including unrolling said reflective film and generally continuously applying said reflective film to said surface of said generally continuously formed sheet.

9. A method for forming a reflective element substrate for a mirror assembly of a vehicle comprising:
   generally continuously forming an elongated sheet of substrate material, said substrate material comprising a polymeric resin material;
   applying a substantially transparent functional film to a surface of said elongated sheet;
   unrolling said substantially transparent functional film from a reel or roll of said film and applying said unrolled film to said surface of said elongated sheet generally continuously as said sheet is formed or extruded or cast;
   forming two or more mirror substrates from said elongated sheet after said film is applied to said surface of said sheet; and
   forming a vehicle mirror assembly with one of said two or more mirror substrates.

10. The method of claim 9 including applying a reflective film to an opposite surface of said sheet.

11. The method of claim 10, wherein said reflective film is sufficiently flexible to be provided in a reel or roll form, said method including unrolling said reflective film and generally continuously applying said reflective film to said opposite surface of said generally continuously formed sheet.

12. The method of claim 9 including applying a reflective film to said surface of said sheet, wherein applying said functional film comprises applying said functional film to said reflective film.

13. The method of claim 12, wherein said reflective film is sufficiently flexible to be provided in a reel or roll form, said method including unrolling said reflective film and generally continuously applying said reflective film to said surface of said generally continuously formed sheet.

14. The method of claim 9, wherein said substantially transparent functional film provides a hydrophilic function.

15. The method of claim 9, wherein said substantially transparent functional film provides a hydrophobic function.

16. The method of claim 9, wherein said substantially transparent functional film provides an anti-abrasion function.

17. The method of claim 1, wherein said substantially transparent functional film provides a hydrophilic function.

18. The method of claim 4, wherein said substantially transparent functional film provides an anti-abrasion function.

19. The method of claim 5, wherein applying a reflective film comprises applying a polymeric reflective film to an opposite surface of said sheet.

20. The method of claim 8, wherein applying a reflective film comprises applying a polymeric reflective film to said surface of said sheet.

* * * * *

UNITED STATES PATENT AND TRADEMARK OFFICE
CERTIFICATE OF CORRECTION

PATENT NO. : 7,842,154 B2  Page 1 of 1
APPLICATION NO. : 12/197666
DATED : November 30, 2010
INVENTOR(S) : Niall R. Lynam It is certified that error appears in the above-identified patent and that said Letters Patent is hereby corrected as shown below:

Column 11
Claim 8, Line 15, "than" should be --form--

Signed and Sealed this
Fifteenth Day of November, 2011

David J. Kappos
*Director of the United States Patent and Trademark Office*